United States Patent
Lee et al.

(10) Patent No.: US 7,200,329 B2
(45) Date of Patent: Apr. 3, 2007

(54) WAVELENGTH PATH MONITORING/CORRECTING APPARATUS IN TRANSPARENT OPTICAL CROSS-CONNECT AND METHOD THEREOF

(76) Inventors: Ki-Cheol Lee, #201-1701, Wonchon Jugong 2-danji APT., Wonchon-dong, Paldal-gu, Suwon-shi, Kyonggi-do (KR); Yun-Je Oh, #102-202, Dongilhivil, Unnam-ri, Kusong-myon, Yongin-shi, Kyonggi-do (KR); Jong-Kwon Kim, 146-12, Kayang 2-dong, Tong-gu, Taejonkwangyok-shi (KR)

( * ) Notice: Subject to any disclaimer, the term of this patent is extended or adjusted under 35 U.S.C. 154(b) by 766 days.

(21) Appl. No.: 10/635,943

(22) Filed: Aug. 7, 2003

(65) Prior Publication Data
US 2004/0151497 A1 Aug. 5, 2004

(30) Foreign Application Priority Data
Feb. 5, 2003 (KR) .................. 10-2003-0007205

(51) Int. Cl.
*H04J 14/02* (2006.01)
(52) U.S. Cl. .................. 398/50; 398/12; 398/19; 398/47; 398/51
(58) Field of Classification Search .............. 398/12, 398/19, 47–51
See application file for complete search history.

(56) References Cited

U.S. PATENT DOCUMENTS

| | | | | |
|---|---|---|---|---|
| 5,754,320 | A | * 5/1998 | Watanabe et al. | 398/50 |
| 5,867,289 | A | * 2/1999 | Gerstel et al. | 398/12 |
| 6,559,984 | B1 * | 5/2003 | Lee et al. | 398/5 |
| 6,788,896 | B1 * | 9/2004 | Wang et al. | 398/51 |

FOREIGN PATENT DOCUMENTS

| JP | 08-186559 | 7/1996 |
|---|---|---|
| JP | 2000-069510 | 3/2000 |

* cited by examiner

*Primary Examiner*—Leslie Pascal
(74) *Attorney, Agent, or Firm*—Cha & Reiter LLC

(57) ABSTRACT

A wavelength-path-monitoring/correcting apparatus used in a transparent OXC is disclosed. The apparatus includes: a path-information-generating section for generating path-monitoring information; a plurality of optical couplers for coupling each output signal of the wavelength-division demultiplexers with the pertinent path-monitoring information; a plurality of optical switches for switching each optical signal inputted from the optical couplers; a plurality of wavelength-division multiplexers for multiplexing optical signals inputted through the optical switches; a path-information-detecting section for detecting the path-monitoring information from optical signals outputted from the wavelength-division multiplexers; and, a path-control section for comparing the path-monitoring information detected through the path-information-detecting section with predetermined optical-switching information and for correcting switched paths.

16 Claims, 9 Drawing Sheets

WAVELENGTH PATH MONITORING/CORRECTING APPARATUS IN TRANSPARENT OPTICAL CROSS-CONNECT AND METHOD THEREOF

CLAIM OF PRIORITY

This application claims priority to an application entitled "Wavelength path monitoring/correcting apparatus in transparent optical cross-connect and method thereof," filed in the Korean Intellectual Property Office on Feb. 5, 2003 and assigned Serial No. 2003-7205, the contents of which are hereby incorporated by reference.

BACKGROUND OF THE INVENTION

1. Field of the Invention

The present invention relates to a transparent optical cross-connect (OXC) in a wavelength-division-multiplexing (WDM) optical-communication network, and more particularly to an apparatus for monitoring and correcting the paths of wavelength channels.

2. Description of the Related Art

In general, a transmission rate in an optical-communication network can reach a speed of several Gb/s to several Tb/s according to the type of network. In order to meet a high-speed transmission requirement, a large-capacity OXC together with a high speed of DWDM (Dense Wavelength-Division-Multiplexing) optical-transmission system are employed.

Up to now, opaque OXCs using optical-electric-optical conversions have been used predominantly, but henceforth it is expected that transparent OXCs without the optical-electric-optical conversions will be used more frequently within two to three years. In an OXC network, wavelength channels inputted to a transparent OXC are outputted through optical switches according to predetermined routing/switching information of wavelength channels. Thus, it is necessary to monitor whether the input-wavelength channels are switched correctly at the respective, pertinent output ends according to the routing information of the wavelength channels, which is also known as OXC path monitoring.

FIG. 1 is a block diagram illustrating a wavelength-path-monitoring apparatus according to the prior art.

In operation, optical signals of a first input port ($\lambda_1 \sim \lambda_n$) to an $N^{th}$ input port ($\lambda_1 \sim \lambda_n$) are inputted to the respective pertinent FPFs (Fabry Perot Filters) in the optical-amplifying section 10. The FPF is a device used for maintaining laser wavelengths uniformly. A reference number 10A represents an input port as an example for describing detailed construction and operation of the optical-amplifying section 10. As shown in 10A, optical signals, which are inputted to an EDFA (Erbium-Doped Fiber Amplifier) through an optical coupler a of an input point (IN), are transmitted to a FPF through an optical coupler b of an output point (OUT), then fed back to the optical coupler a of the input point (IN). The FPF detects the wavelength of an ASE (Amplified Spontaneous Emission) portion outputted from the EDFA according to each input port. That is, the FPF of the first input port detects the wavelength of the ASE portion periodically by utilizing a first frequency $f_1$, and the FPF of the $N^{th}$ input port detects the wavelength of the ASE portion periodically by utilizing an $N^{th}$ frequency $f_N$.

The ASE signals and optical-input signals detected by the above method are demultiplexed into individual wavelengths through a plurality of wavelength-division multiplexers (WDMs) 12. WDMs are one type of Arrayed Waveguide Grating (hereinafter, referred to as "AWG"). Then, each optical signal of $\lambda_i$ is demultiplexed together with a pertinent ASE wavelength of "$\lambda_i$+FSR (Free Spectral Range)".

Each ASE wavelength signal is detected by fiber Bragg gratings (FBG) 24 at the output side of the OXC, and then each frequency is detected by a frequency-detection module 20. For example, when an ASE wavelength of "$\lambda_n$+FSR" modulated in a second frequency $f_2$ is detected at a first output port, it indicates that an optical signal $\lambda_n$ of the second input port has switched onto the first output port.

After each path of the input-wavelength signals are calculated by the ASE wavelength information and the frequency information is detected through the process described above, a comparator 22 compares each of the calculated paths with predetermined routing/switching information so as to check whether or not the input wavelength signals have been switched correctly. If errors are found, a routing-control module 18 controls optical switches 14 to correct the path of the pertinent optical signals.

In order to monitor the paths of wavelength signals as described above, there must be the same number of ASE wavelength channels as there are input WDM channels. However, because the WDM opticaltransmission system according to the prior art transmits 32 or 64 channels of optical signals utilizing all the wavelength bands of EDFA, it is impossible to procure any ASE wavelength channels when monitoring the paths of wavelength channels. In addition, n×N fiber Bragg gratings (n is the number of wavelengths and N is the number of inputs or outputs) are needed which in turn requires n×N optical receivers for monitoring the paths in the frequency-detection module. This adds a high cost to the manufacturing of the wavelength-path-monitoring apparatus. Another high-cost wavelength-tunable filter must be also used for the purpose of detecting the ASE wavelength.

Accordingly, there is a need for an improved system for monitoring and correcting the wavelength paths of an optical cross-connect device in a simpler and more inexpensive implementation.

SUMMARY OF THE INVENTION

One aspect of the present invention is to provide a wavelength-path-monitoring/correcting apparatus that may be realized in a reliable and inexpensive implementation, by reducing the number of optical receivers and fiber Bragg gratings necessary to monitor the optical-signal paths and a method thereof.

Another aspect of the present invention is to provide a wavelength-path-monitoring/correcting apparatus capable of achieving a low manufacturing cost and a simplification of construction, by detecting switching-information of wavelength channels through a time-slot detection and by using general laser diodes and fiber-delay lines which do not incorporate the high cost FPFs.

In one embodiment, a wavelength-path-monitoring/correcting apparatus in a transparent OXC (optical cross-connect) of a wavelength-division-multiplexing optical-communication network is provided and includes: a path-information-generating section for generating the path-monitoring information so as to check each input port and each switching path of optical signals; a plurality of optical couplers for coupling each output signal of the wavelength-division demultiplexers with pertinent path-monitoring information generated from the path-information-generating section; a plurality of optical switches for switching each optical signal inputted from the optical couplers; a plurality of wavelength-division multiplexers for multiplexing optical signals inputted through the optical switches; a path-information-detecting section for detecting the path-monitoring information from optical signals outputted from the wavelength-division multiplexers; and, a path-control section for comparing the path-monitoring information detected through the path-information-detecting section with predetermined optical-switching information and for correcting erroneously switched paths.

In another embodiment, a method for monitoring/correcting the paths of optical signals in a transparent OXC (optical cross-connect) of a wavelength-division-multiplexing optical-communication network is provided. The method includes the steps of: generating an $i^{th}$ frequency for each time frame, the $i^{th}$ frequency having the length of a time slot, optically-modulating the $i^{th}$ frequency to a wavelength channel for path monitoring, and coupling the modulated signal—after delay for predetermined time—with an optical signal inputted to the OXC; detecting a path-monitoring wavelength from the optical-switched signal; detecting the $i^{th}$ frequency and time-slot-position information from the detected signal of the path-monitoring wavelength; and, calculating the path of an optical signal from the detected $i^{th}$ frequency and time-slot-position information, comparing the calculated path with predetermined path-switching information, and correcting the path of the optical signal according to the comparison result.

DETAILED DESCRIPTION OF THE PREFERRED EMBODIMENT

Figure 1:
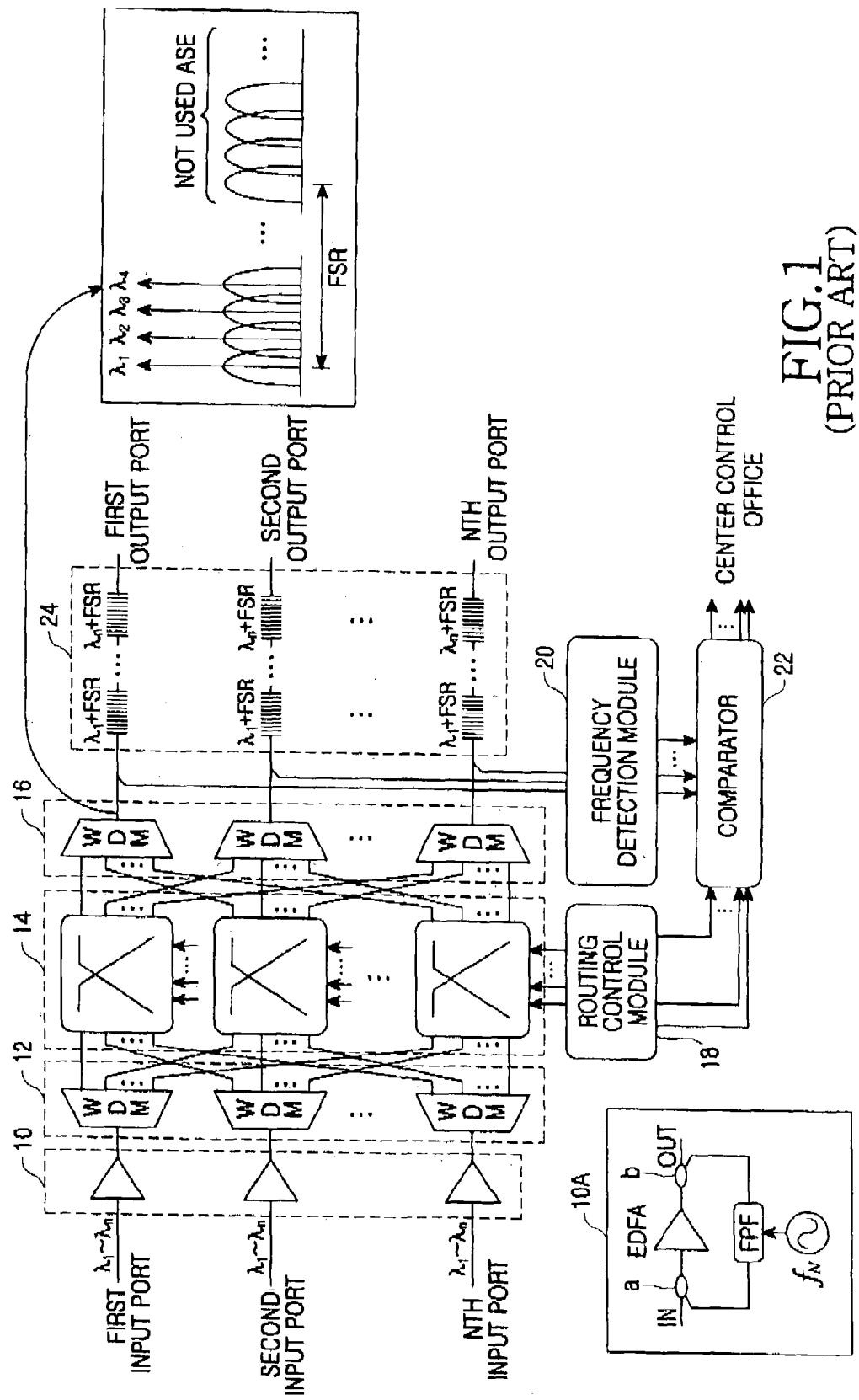
FIG. 1 is a block diagram illustrating an optical-signal-path-monitoring apparatus for an OXC according to the prior art.

Hereinafter, a wavelength-path-monitoring/correcting apparatus in a transparent optical cross-connect and a method thereof according to preferred embodiments of the present invention will be described with reference to the accompanying drawings. It is to be noted that the same elements are indicated with the same reference numerals throughout the drawings. For the purposes of clarity and simplicity, a detailed description of known functions and configurations incorporated herein will be omitted as it may make the subject matter of the present invention unclear.

Figure 2:
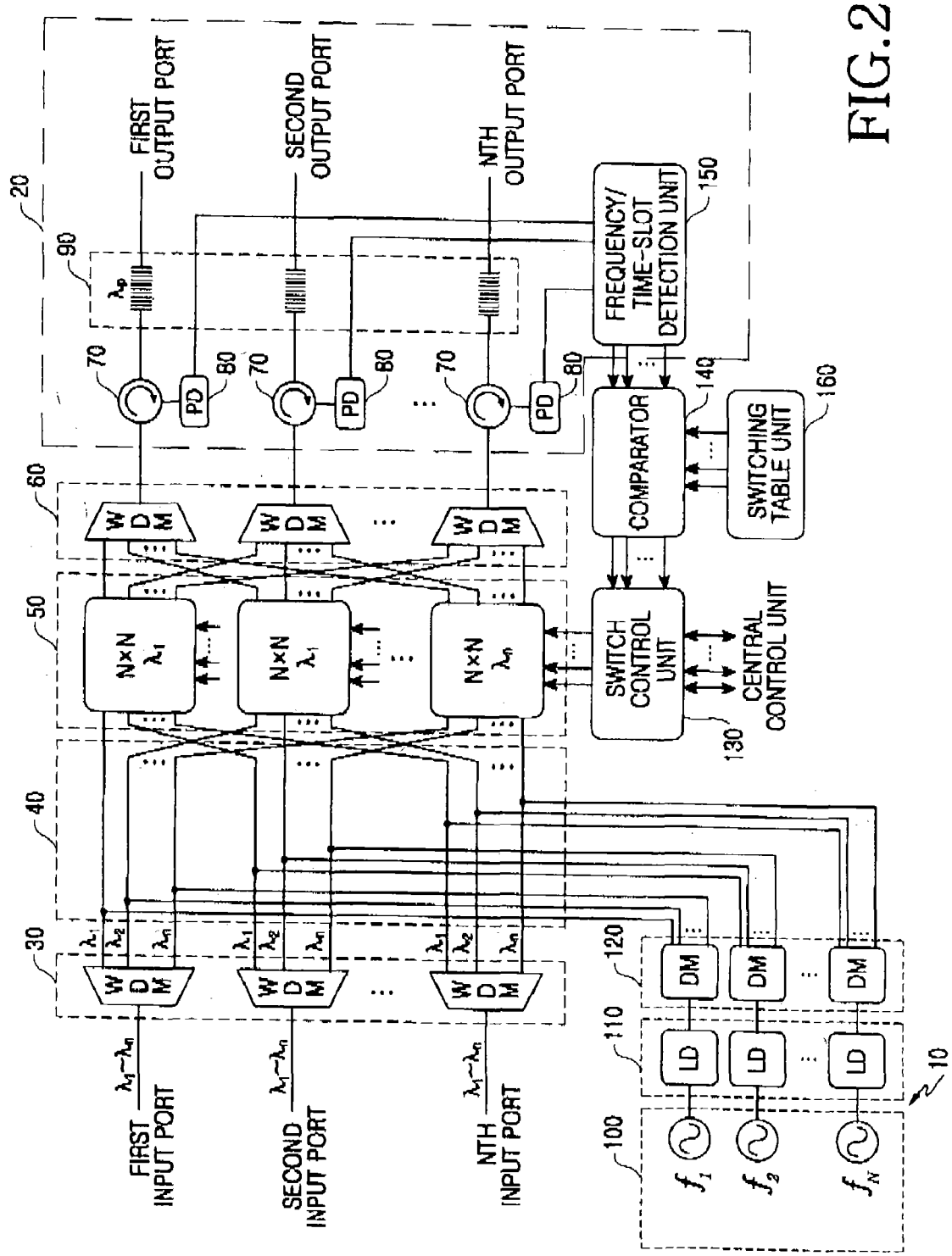
FIG. 2 is a block diagram illustrating an optical-signal-path monitoring and correcting apparatus for an OXC according to a first embodiment of the present invention.

FIG. 2 is a block diagram illustrating an optical-signal-path monitoring and correcting apparatus used in an OXC device according to a first embodiment of the present invention. As shown, a path-information-generating section 10 includes a plurality of frequency generators 100 for generating frequencies different from one another, a plurality of laser diodes 110 having a wavelength of $\lambda_P$ for modulating each frequency generated from the frequency generators 100, and a plurality of optical-delay modules 120 for delaying each frequency optically modulated by the laser diodes 110 according to predetermined times.

In operation, a first to an $N^{th}$ wavelength-division demultiplexers 30 demultiplex each signal inputted through a first to an $N^{th}$ input ports respectively. Optical couplers 40 couple each output signal of the wavelength-division demultiplexers 30 with each path-monitoring information generated from the path-information-generating section 10. Optical switches 50 switch each optical signal coupled with the path-monitoring information at the optical couplers 40 according to predetermined switching information. Wavelength-division multiplexers 60 multiplex optical signals transmitted through the optical switches 50.

A path-information-detecting section 20 comprises a plurality of optical circulators 70, a plurality of optical receivers 80, a plurality of fiber Bragg gratings (reflection filters) 90, and a frequency/time-slot-detection unit 150. The optical circulators 70 detect a path-monitoring wavelength $\lambda_1$ from data coupled with path-monitoring information and outputted from the wavelength-division multiplexers 60. The optical receivers 80 convert each path-monitoring wavelength $\lambda_1$ detected by each optical circulator 70 to an electric signal. The fiber Bragg gratings 90 output data received through each optical circulator 70 to a first to an $N^{th}$ output ports respectively. The frequency/time-slot-detection unit 150 detects the time slot and frequency from each electric-signal output from each optical receiver 80.

A path-control section comprises a switch-control unit 130, a comparator 140, and a switching-table unit 160. The switching-table unit 160 stores switching information of each optical signal inputted through the first input port to the $N^{th}$ input port.

The comparator 140 compares the path-monitoring information detected through the frequency/time-slot-detection unit 150 with the routing/switching information stored in the switching-table unit 160. If an erroneous path is detected, the switch-control unit 130 controls the optical switches 50 to correct the erroneous path.

In the embodiment, the method for monitoring the wavelength-signal paths of the optical-signal-path-monitoring/correcting apparatus uses time frames. That is, each time frame has the same number of time slots as the number of inputted wavelengths and each input-data wavelength, so the pertinent input port is detected by the position of each time slot.

For example, in a case in which a second frequency $f_2$ is positioned at the first time slot of a time frame, the number 2 of the second frequency $f_2$ represents a second input port and the first time slot represents that the input data is $\lambda_1$. That is, the position of each time slot in time frame represents input data, whereas the number of pertinent frequency represents the number of input ports. As a further example, in a case in which a seventh frequency $f_7$ is positioned at a third time slot of the time frame, the number 7 of the seventh frequency $f_7$ represents the seventh input port, and the third time slot represents that the input data is $\lambda_3$.

Figure 3:
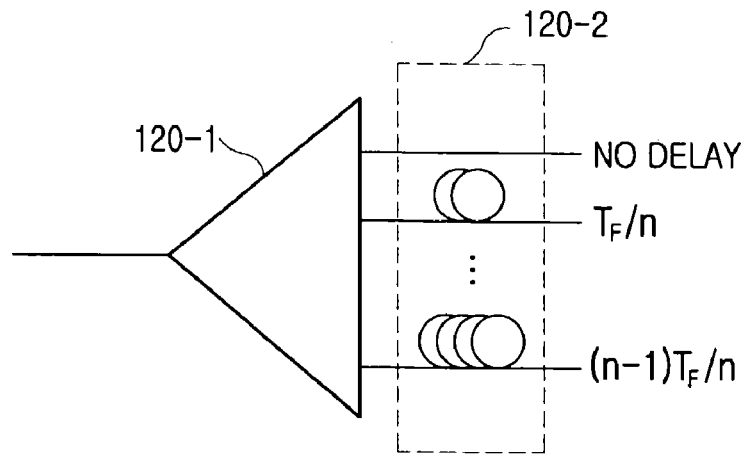
FIG. 3 is a detailed view of an optical-delay module shown in FIG. 2.

FIG. 3 is a detailed view of an optical-delay module 120 shown in FIG. 2. As shown, each optical-delay module 120 comprises optical couplers 120-1 for distributing an optical-modulated frequency inputted from a pertinent laser diode 110, and a plurality of fiber-delay lines 120-2 for delaying and outputting in an orderly manner the distributed frequencies according to predetermined intervals.

Figure 4:
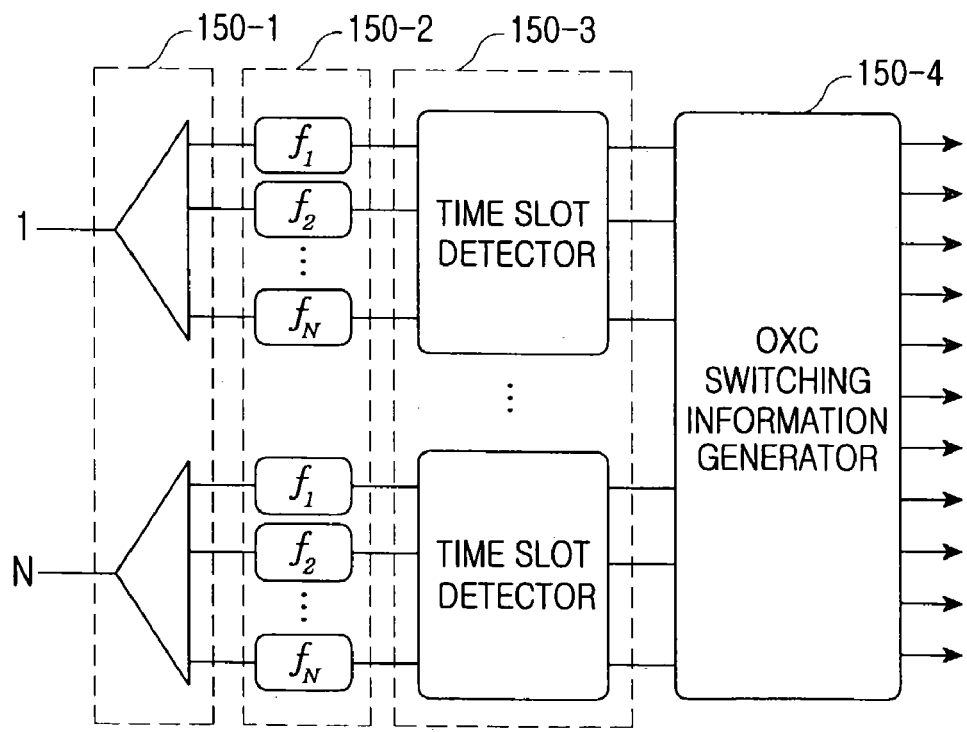
FIG. 4 is a detailed view of the frequency/time-slot-detection unit shown in FIG. 2.

FIG. 4 is a detailed view of a frequency/time-slot-detection unit shown 150 in FIG. 2. As shown, the frequency/time-slot-detection unit 150 comprises a plurality of electric-signal distributors 150-1 for distributing electric signals received through the optical receivers 80 according to the input wavelength, a plurality of band-pass-filter arrays 150-2 for sensing the input port by detecting the frequency component from each signal distributed according to each wavelength by the electric-signal distributors 150-1, a plurality of time-slot detectors 150-3 for detecting the time-slot position in the time frame from each electric signal inputted through the band-pass-filter arrays 150-2, and OXC switching-information generators 150-4 for generating a switched table of the input optical-signal paths using the detected frequencies and time-slot position.

Figure 5:
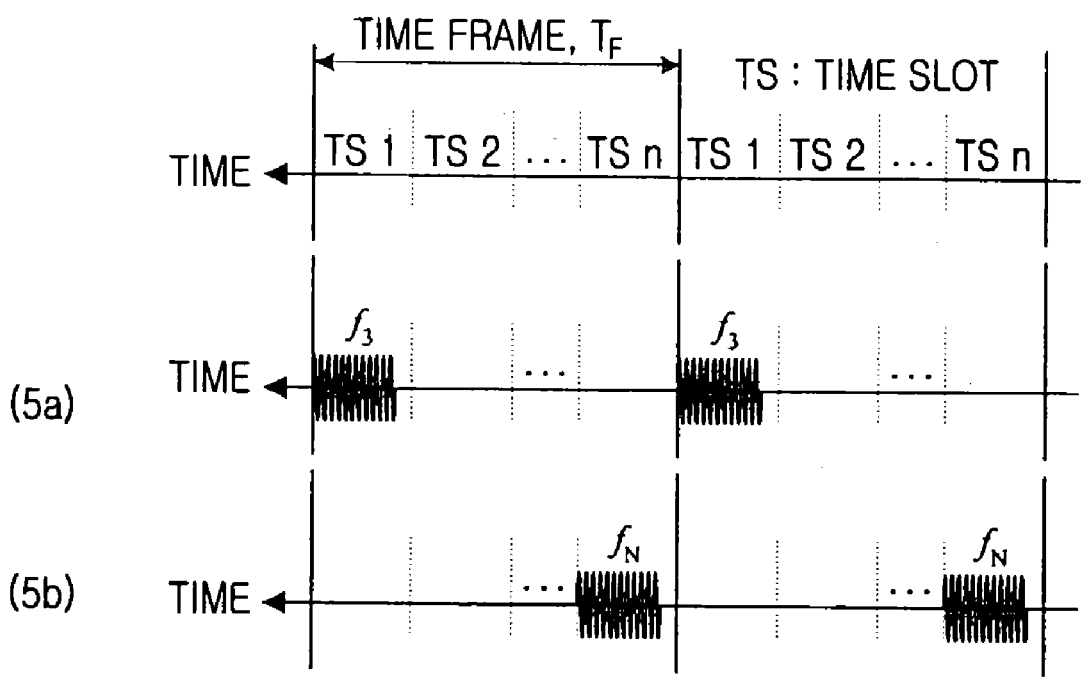
FIG. 5 is a view illustrating the time frame used in an optical-signal-path-monitoring apparatus for an OXC.

FIG. 5 is a view illustrating the time frame used in an optical-signal-path-monitoring apparatus for an OXC device.

In monitoring and correcting the optical-signal paths, the input port and transmission paths of data are detected and controlled by means of the time frames. As shown in FIG. 5, each time frame $T_F$ has N time slots TS1 to TSn equal to the number of wavelengths of input data. On the $i^{th}$ frequency $f_i$ positioned a time slot in a time frame $T_F$, the number i represents the input port and the pertinent time-slot position represents the wavelength of input data. For example, in the case in which a third frequency $f_3$ is positioned at the first time slot TS1 of time frame $T_F$ as shown at (5a) in FIG. 5, it represents that a signal of wavelength $\lambda_1$ is inputted through a third input port. Also, if an $N^{th}$ frequency $f_N$ is positioned at an $N^{th}$ time slot TSn of time frame $T_F$ as shown at (5b) in FIG. 5, it represents that a signal of wavelength $\lambda_n$ is inputted through an $N^{th}$ input port.

Figure 6:
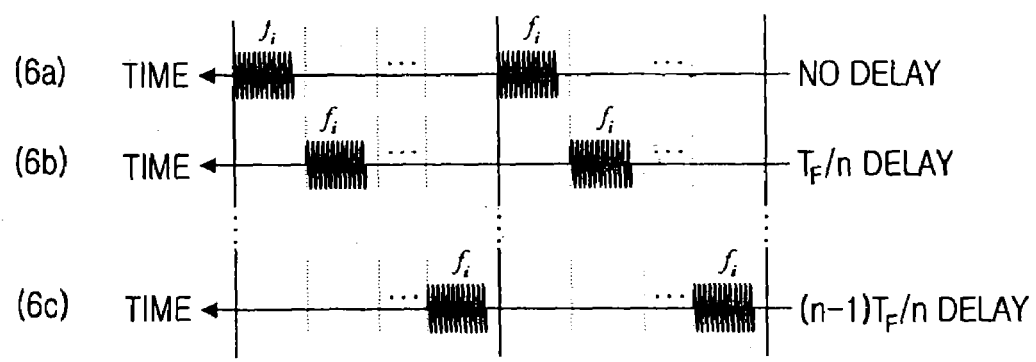
FIG. 6 is a view illustrating the output examples of an optical-delay-module shown in FIG. 2.

FIG. 6 is a view illustrating the output examples of an optical-delay module 120 shown in FIG. 2 in order to facilitate an understanding of the present invention.

Now, the operation of the optical-signal-path-monitoring/correcting apparatus used in an OXC according to a first embodiment of the present invention will be explained with reference to FIG. 2 to FIG. 6 described above.

Referring to FIG. 2, each frequency generator 100 generates a first frequency $f_1$ to an $N^{th}$ frequency $f_N$ so as to discriminate input data. The number of generated frequencies is the same number as the number of input ports. Each generated frequency component is modulated by each laser diode 110 having a wavelength of $\lambda_P$. Each modulated optical signal is then delayed by each optical-delay module 120.

Referring to FIG. 3 which illustrates a detailed construction of an optical-delay module 120, the modulated optical signal is distributed to n number of optical signals through the optical couplers 120-1, and then delayed and outputted in order according to predetermined intervals.

Referring to FIG. 6 which shows the output of the optical-delay lines 120-2, the optical signals passing the optical-delay lines 120-2 are delayed in sequence. As shown, a first optical signal 6a has no delay, a second optical signal 6b has a delay of $T_F/n$, and an $n^{th}$ optical signal 6c has a delay of $((n-1) T_F)/n$. Thereafter, the optical signals are positioned in each time slot and coupled with the wavelength inputted into an OXC device by the optical couplers 40. The $T_F$ represents the length of a time frame.

For example, with a second frequency $f_2$, the number 2 of the second frequency $f_2$ represents a second input port of the second frequency $f_2$ positioned in the first time slot represents a wavelength of $\lambda_1$. Also, the component of the second frequency $f_2$ positioned in the second time slot represents a wavelength of $\lambda_2$, and the component of the second frequency $f_2$ positioned in an $N^{th}$ time slot represents a wavelength of $\lambda_n$.

Meanwhile, optical signals inputted to the OXC are divided according to each wavelength by the wavelength-division demultiplexers 30 and then coupled with frequency components by the optical couplers 40. Here, the frequency components have a wavelength of $\lambda_P$, which represents the path-monitoring information for the wavelength, generated from the optical-delay module 120 in the path-information-generating section 10 and coupled in a respective time slot. Thus, a frequency component of $f_2$ positioned in a $j^{th}$ time slot of a time frame is an optical signal inputted through an $i^{th}$ input port and then coupled with a wavelength of $\lambda_P$ by the optical couplers 40. The path-monitoring wavelengths $\lambda_p$ coupled with optical signals by the optical couplers 40 are switched to the respective output port by the optical switches 50 according to predetermined switching information.

Thereafter, the optical signals and path-monitoring wavelengths $\lambda_P$, which are switched by the optical switches 50, are multiplexed through the wavelength-division multiplexers 60, and then are inputted to the optical circulators 70 and the fiber Bragg gratings 90 in order to detect the path-monitoring wavelengths. The optical circulators 70 detect the path-monitoring wavelength $\lambda_P$ from the inputted optical signals, but the optical signals are outputted through the fiber Bragg gratings 90.

The optical receivers 80 convert the $\lambda_P$ detected by optical circulators 70 into corresponding electric signals. The path-monitoring signals converted to the electric signals are inputted to the frequency/time-slot-detection unit 150, and then the frequency/time-slot-detection unit 150 checks whether or not switching operations of data are performed correctly by checking the input port, output port, time-slot position, and so forth.

Referring to FIG. 4, the electric signal inputted to the frequency/time-slot-detection unit 150 is distributed to N number of electric signals by each of the electric-signal distributors 150-1, and then inputted to the band-pass-filter arrays 150-2 for frequency detection. Using the frequency information detected by the band-pass-filter arrays 150-2, the input-port information of each pertinent optical signal can be obtained. The frequency components detected by the band-pass-filter arrays 150-2 are inputted to the time-slot detectors 150-3. Then, the time-slot detectors 150-3 detect the position information of a time slot from each of the inputted frequency components.

Figure 7:
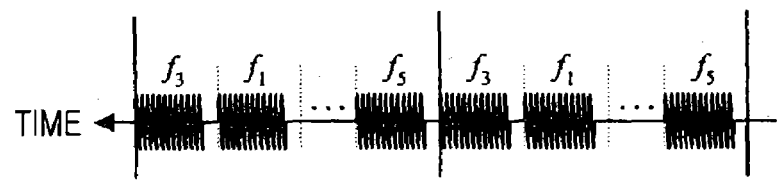
FIG. 7 is a view illustrating an example of a time frame inputted into the frequency/time-slot-detection unit according to the present invention.

FIG. 7 is a view illustrating an example of a time frame inputted into an frequency/time-slot-detection unit 150 according to the present invention. In particular, FIG. 7 shows a case in which signals of the time frame are detected at the first output port and further shows the component of a third frequency $f_3$ positioned in the first time slot, the component of a first frequency $f_1$ positioned in the second time slot, and the component of a fifth frequency $f_5$ positioned in an $N^{th}$ time slot.

The time frame passes the band-pass-filter arrays 150-2 and the time-slot detectors 150-3 to detect each frequency component and time-slot-position information. Then, the OXC switching-information generators 150-4 generate a switched table indicating that a signal of frequency $\lambda_1$ is from a third input port, a signal of frequency $\lambda_2$ is from a first input port, and a signal of frequency $\lambda_n$ is from a fifth input port are switched to a first output port.

The switched table generated by the OXC switching-information generators 150-4 as described above is compared, in the comparator 140, with a predetermined switching table stored in the switching-table unit 160.

If the generated switched information is different from the predetermined switching information, it indicates that an erroneous switching has occurred in the OXC. Then, the comparator 140 transmits a switching-correction signal to the optical switches 50 via the switch-control unit 130, which controls the optical switches 50 so as to correct the switching state of wavelength signals. Accordingly, it is possible to detect switching paths of optical signals inputted in the OXC and also to correct the erroneously switched paths.

Figure 8:
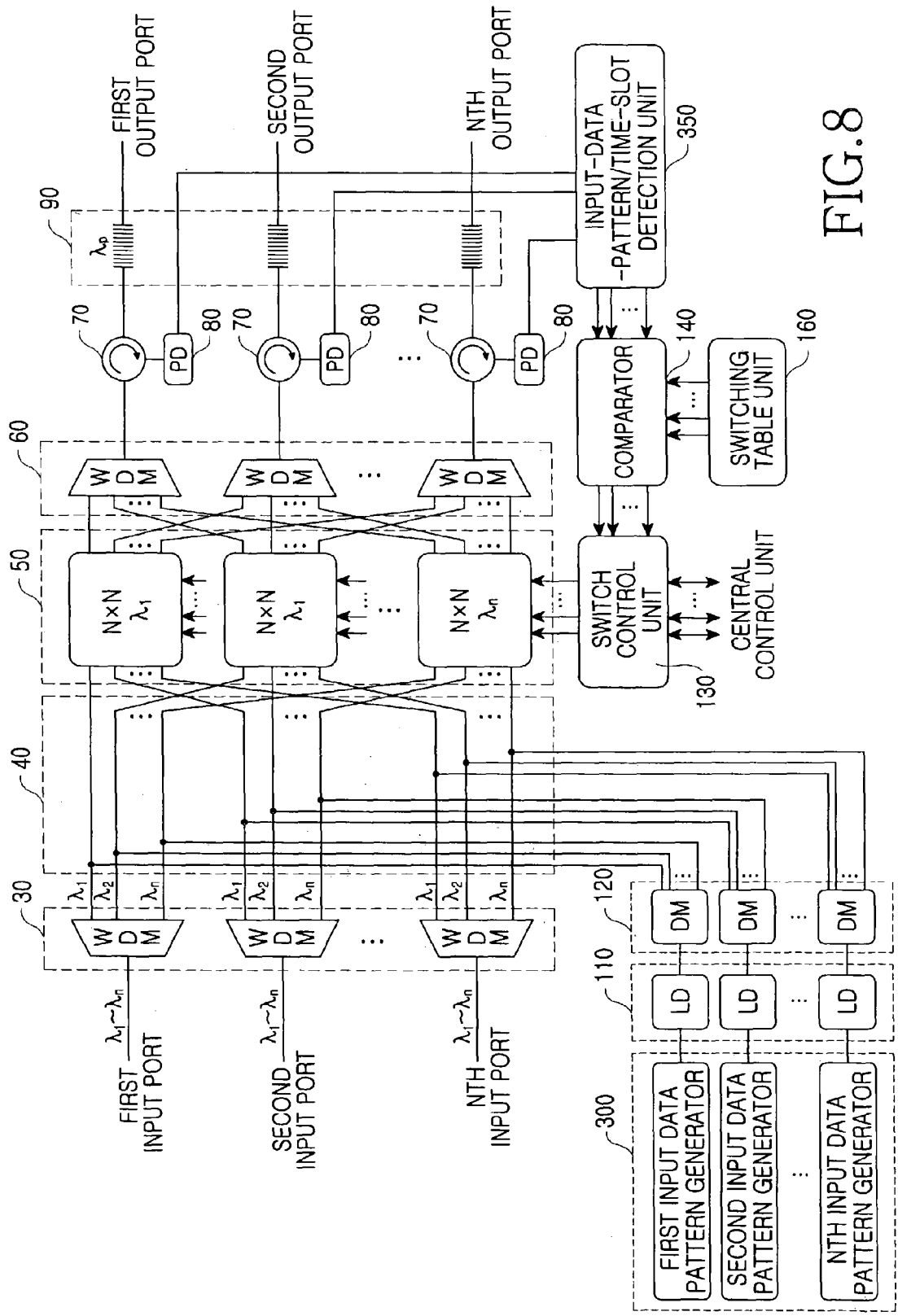
FIG. 8 is a block diagram illustrating an optical-signal-path-monitoring and correcting apparatus for an OXC according to a second embodiment of the present invention.

FIG. 8 is a block diagram illustrating an optical-signal-path-monitoring and correcting apparatus applicable in an OXC according to a second embodiment of the present invention.

Referring to FIG. 8, it is noted that the construction and operation of the second embodiment are essentially same as that described above with respect to FIG. 2, except that the second embodiment utilizes input-data-pattern generators 300 for discriminating input data, instead of the frequency generators 100 utilized in the first embodiment of FIG. 2. Also, the second embodiment utilizes an input-data-pattern/time-slot-detection unit 350 for detecting the switching information of optical signals, instead of the frequency/time-slot-detection unit 150 utilized in the first embodiment of FIG. 2. Hence, the discussion of similar components described in the preceding paragraphs is omitted to avoid redundancy, as they are described with respect to FIG. 2.

The input-data-pattern generators 300, which are devices for discriminating input ports by using predetermined bits, may discriminate a first input port, a second input port, a third input port and a fourth input port by using data patterns of '00', '01', '10', and '11' respectively. The data pattern may be provided with a variety of methods besides the one described above. Then, each data pattern generated in the input-data-pattern generators 300 is detected at the input-data-pattern/time-slot-detection unit 350.

Figure 9:
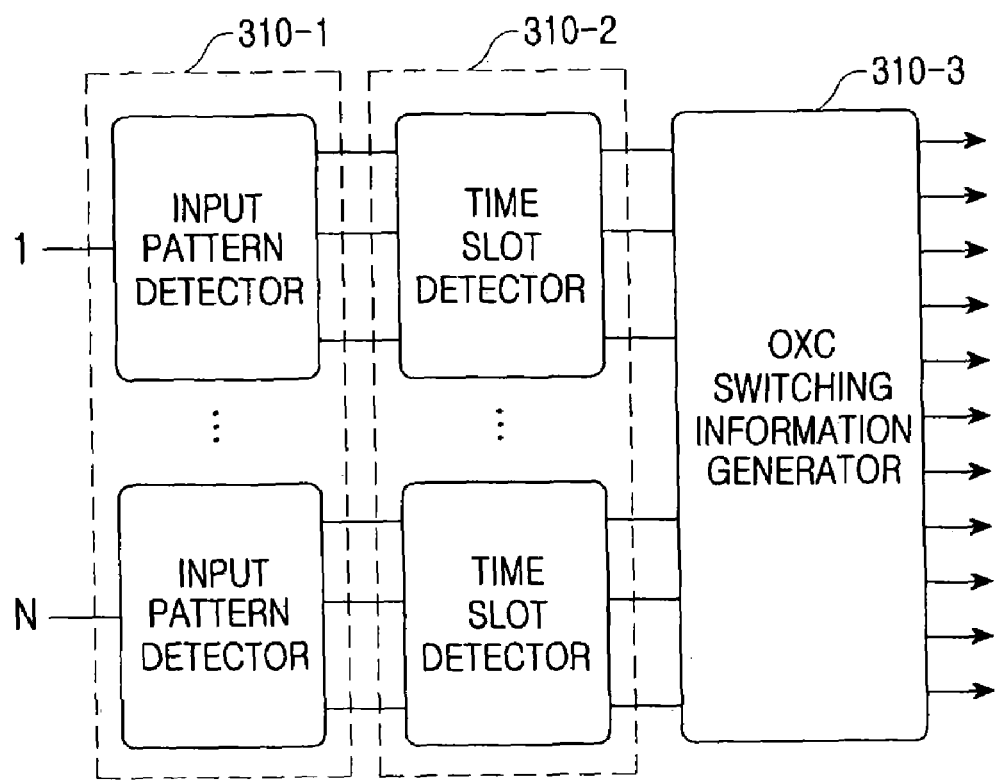
FIG. 9 is a view illustrating a detailed construction of the input-data-pattern/time-slot-detection unit shown in FIG. 8.

FIG. 9 is a view illustrating a detailed construction of the input-data-pattern/time-slot-detection unit 350 shown in FIG. 8.

Input-pattern detectors 310-1 obtain input-port information from inputted electric signals by detecting each data pattern in time frames. Electric signals, in which data patterns are detected, are inputted to time-slot detectors 310-2, then the time-slot detectors 310-2 obtain the time-slot-position information of path-monitoring signals. OXC switching-information generators 310-3 generate an input/output table for the wavelength signals switched through the OXC based on the detected data-pattern information and time-slot information. The input/output table generated by the OXC switching-information generators 310-3 are compared, in the comparator 140, with a predetermined switching table stored in the switching-table unit 160.

As a result of the comparison, if there is an erroneous path, the comparator 140 transmits a switching-correction signal to the switch-control unit 130, and then the switch-control unit 130 controls the optical switches 50, so that the switching state of the optical switches 50 is corrected.

Figure 10:
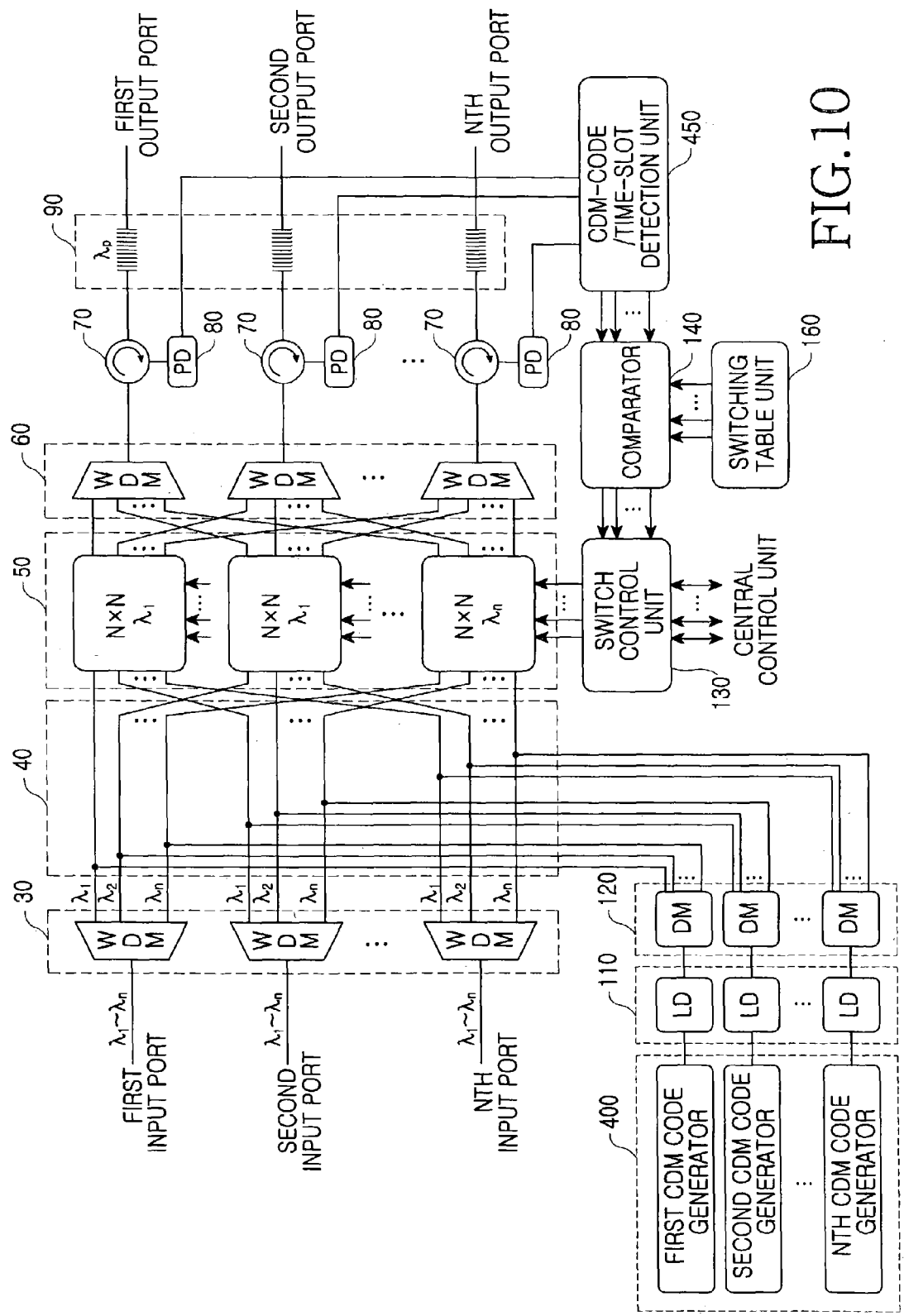
FIG. 10 is a block diagram illustrating an optical-signal-path monitoring and correcting apparatus for an OXC according to a third embodiment of the present invention; and, FIG. 11 is a view illustrating a detailed construction of the CDM-code/time-slot-detection unit shown in FIG. 10.

FIG. 10 is a block diagram illustrating an optical-signal-path-monitoring and correcting apparatus for the OXC according to a third embodiment of the present invention.

It is noted that the construction and operation of the third embodiment are essentially the same as that described above with respect to FIG. 2, except that the third embodiment utilizes CDM (Code Division Multiple) code generators 400 for discriminating input data. Also, the input-monitoring information generated from the CDM code generators 400 is detected in a CDM-code/time-slot-detection unit 450. Thus, a discussion of similar components described in the preceding paragraphs is omitted to avoid redundancy, as they are described with respect to FIG. 2.

Figure 11:
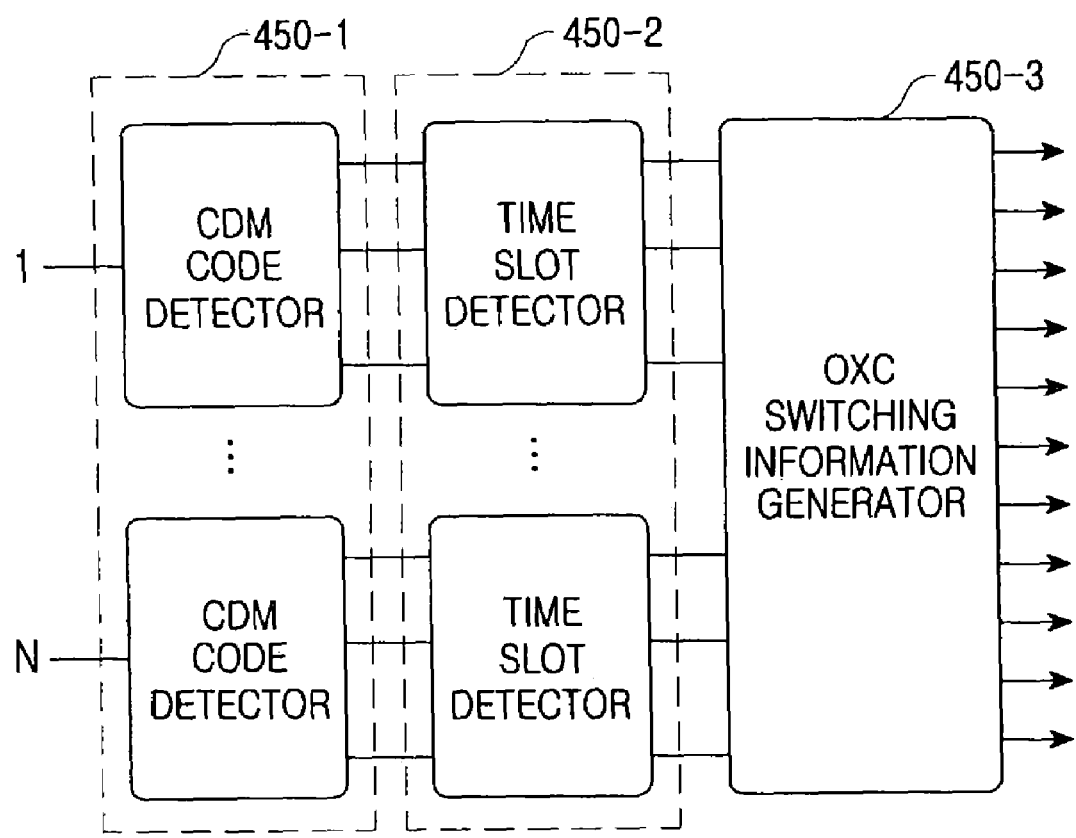

FIG. 11 is a view illustrating a detailed construction of a CDM-code/time-slot-detection unit 450 shown in FIG. 10.

Information of inputted CDM code data is detected in the CDM code detectors 450-1 and time-slot detectors 450-2. OXC switching-information generators 450-3 obtain each input port of wavelength signals switched through the OXC with information of each wavelength based on the detected CDM code information and time-slot-position information.

The comparator 140 compares a CDM-code-input-information table generated from the OXC switching-information generators 450-3 with a predetermined switching table stored in the switching-table unit 160. As a result of the comparison, if there is an erroneous path, the comparator 140 transmits a switching-correction signal to the switch-control unit 130, and then the switch-control unit 130 controls the optical switches 50, so that the switching state of the optical switches 50 is corrected.

While the invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus for monitoring/correcting a wavelength path in a transparent OXC (optical cross-connect) device of a wavelength-division-multiplexing optical-communication network, the apparatus comprising:

a path-information-generating section for generating a path-monitoring information for a subsequent determination of each input port and each switching path of input-optical signals;

a plurality of optical couplers for coupling signal outputs from a plurality of wavelength-division demultiplexers with the path-monitoring-information generated by the path-information-generating section;

a plurality of optical switches for switching signal outputs from the optical couplers;

a plurality of wavelength-division multiplexers for multiplexing signal outputs from the optical switches;

a path-information-detecting section for detecting the path-monitoring information from signal outputs from the wavelength-division multiplexers; and, a path-control section for comparing the path-monitoring information detected by the path-information-detecting section with a predetermined optical-switching information for determining a switching error in the wavelength path.

2. The apparatus as claimed in claim 1, wherein the path-information-generating section comprises:
   a plurality of frequency generators for generating a plurality of predetermined frequencies used to discriminate each input-optical signal;
   a plurality of laser diodes for modulating each frequency generated from the frequency generators; and,
   a plurality of optical-delay modules for delaying the modulated frequency in sequence.

3. The apparatus as claimed in claim 2, wherein each of the optical-delay modules comprises:
   a optical couplet for distributing each modulated frequency; and
   a plurality of fiber-delay lines for delaying and outputting the distributed frequencies in order according to predetermined intervals.

4. The apparatus as claimed in claim 1, wherein the path-information-generating section comprises:
   a plurality of input-data-pattern generators for generating a predetermined bit data used to discriminate each path of the input optical signals;
   a plurality of laser diodes for modulating the predetermined bit data; and,
   a plurality of optical-delay modules for delaying the modulated bit data in time sequence.

5. The apparatus as claimed in claim 4, wherein each of the optical-delay modules comprises:
   a optical coupler for distributing each modulated frequency; and
   a plurality of fiber-delay lines for delaying and outputting the distributed frequencies in order according to predetermined intervals.

6. The apparatus as claimed in claim 1, wherein the path-information-generating section comprises:
   a plurality of CDM code generators for generating a plurality of predetermined CDM codes used to discriminate each path of the input-optical signals;
   a plurality of laser diodes for modulating the CDM codes; and,
   a plurality of optical-delay modules for delaying the modulated CDM codes in sequence.

7. The apparatus as claimed in claim 6, wherein each of the optical-delay modules comprises:
   a optical coupler for distributing each modulated frequency; and
   a plurality of fiber-delay lines for delaying and outputting the distributed frequencies in order according to predetermined intervals.

8. The apparatus as claimed in claim 1, wherein the path-information-detecting section comprises:
   a plurality of optical circulators for detecting the path-monitoring information from the output of the wavelength-division multiplexers;
   a plurality of fiber Bragg gratings for outputting data output from the optical circulators, with the exception of the path-monitoring information;
   a plurality of optical receivers for converting the output of the optical circulators into corresponding electric signals; and,
   an input-port/time-slot-detection unit for detecting the input port and time-slot-position information from the converted electric signals.

9. The apparatus as claimed in claim 8, wherein the input-port/time-slot detection unit comprises:
   a plurality of electric-signal distributors arranged to receive the converted electrical signals and for distributing input-discrimination-wavelengths according to a frequency;
   a plurality of band-pass-filter arrays for detecting the frequency from the wavelengths distributed by the electric-signal distributors;
   a plurality of time-slot detectors for detecting a position information of time slots from the wavelength signals outputted from the band-pass-filter arrays; and,
   an OXC-switching-information generator for generating a switched table using the detected frequency information and the time-slot-position information.

10. The apparatus as claimed in claim 8, wherein the input-port/time-slot-detection unit comprises:
    a plurality of input pattern detectors for detecting an input-port information from the converted electric signals;
    a plurality of time-slot detectors for detecting a position information of time slots from the signal outputs from the input-pattern detectors; and,
    an OXC-switching-information generator for generating a switched table according to the detected input-port information and the time-slot-position information.

11. The apparatus as claimed in claim 8, wherein the input-port/time-slot-detection unit comprises:
    a plurality of CDM code detectors for detecting input-port information from the converted electric signals;
    a plurality of time-slot detectors for detecting a position information of time slots from the signal outputs from the CDM code detectors; and,
    an OXC-switching-information generator for generating a switched table according to the detected input-port information and the time-slot-position information.

12. The apparatus as claimed in claim 1, wherein the path-control section comprises:
    a switching-table unit for storing an optical-signal-switching information;
    a comparator for comparing the detected path-monitoring information with switching information stored in the switching-table unit; and,
    a switch-control unit for controlling paths of optical signals when an erroneous path exists according to the comparison result.

13. A method for monitoring/correcting paths of optical signals in a transparent OXC (optical cross-connect) device of a wavelength-division-multiplexing optical-communication network, the method comprising the steps of:
    modulating a plurality of $i^{th}$ frequencies into a plurality of wavelengths and delaying the modulated wavelengths in a time-division manner;
    coupling the delayed wavelengths with input-optical signals of the OXC;
    performing an optical-switching of the coupled optical signals;
    detecting a path-monitoring wavelength from the respective optical-switched signals;
    detecting at least one $i^{th}$ frequency and a time-slot position from the detected path-monitoring wavelength; and,
    calculating a path of an optical signal from the detected $i^{th}$ frequency and time-slot-position information, comparing the calculated path with predetermined path-switching information, and correcting the path of the input-optical signals according to the comparison result.

14. The method as claimed in claim 13, wherein the detected $i^{th}$ frequency indicates an input port and the time-slot-position information indicates a particular wavelength of an input-optical signal.

15. A method for monitoring/correcting paths of optical signals in a transparent OXC (optical cross-connect) device of a wavelength-division-multiplexing optical-communication network, the method comprising the steps of:

modulating a sequence of predetermined bit data and delaying the modulated bit data in a time-division manner;

coupling the delayed wavelengths with input-optical signals of the OXC;

performing an optical-switching of the coupled optical signals;

detecting a path-monitoring wavelength from the respective optical-switched signals;

detecting an input-data pattern and a time-slot position from the detected path-monitoring wavelength; and, calculating a path of an optical signal from the detected input-data pattern and time-slot-position information, comparing the calculated path with predetermined path-switching information, and correcting the path of the input optical signals according to the comparison result.

16. A method for monitoring/correcting the paths of optical signals in a transparent OXC (optical cross-connect) device of a wavelength-division-multiplexing optical-communication network, the method comprising the steps of:

modulating a sequence of CDM codes and delaying the modulated CDM codes in a time-division manner;

coupling the delayed CDM codes with input-optical signals of the OXC;

performing an optical-switching of the coupled optical signals;

detecting a CDM code and a time-slot position from the respective optical-switched signals; and, calculating a path of an optical signal from the detected CDM codes and time-slot-position information, comparing the calculated path with predetermined path-switching information, and correcting the path of the input-optical signals according to the comparison result.

* * * * *

UNITED STATES PATENT AND TRADEMARK OFFICE
CERTIFICATE OF CORRECTION

PATENT NO. : 7,200,329 B2
APPLICATION NO. : 10/635943
DATED : April 3, 2007
INVENTOR(S) : Ki-Cheol Lee et al.

It is certified that error appears in the above-identified patent and that said Letters Patent is hereby corrected as shown below:

Title Page
Item [73], Assignee is omitted. Should read as follows:

[73] Assignee: Samsung Electronics Co., Ltd.,
Suwon-Si (KR)

Signed and Sealed this

Twenty-eighth Day of September, 2010

David J. Kappos
*Director of the United States Patent and Trademark Office*